United States Patent
Daude et al.

(10) Patent No.: US 8,161,136 B2
(45) Date of Patent: *Apr. 17, 2012

(54) METHOD AND SYSTEM FOR OPTIMIZING PERFORMANCE AND AVAILABILITY OF A DYNAMIC HOST CONFIGURATION PROTOCOL (DHCP) SERVICE

(75) Inventors: Olivier Daude, Nice (FR); Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 749 days.

This patent is subject to a terminal disclaimer.

(21) Appl. No.: 11/696,756

(22) Filed: Apr. 5, 2007

(65) Prior Publication Data
US 2007/0183426 A1 Aug. 9, 2007

Related U.S. Application Data

(63) Continuation of application No. 09/455,196, filed on Dec. 6, 1999, now Pat. No. 7,254,630.

(30) Foreign Application Priority Data

Aug. 20, 1999 (FR) .................................... 98 480077

(51) Int. Cl.
*G06F 15/177* (2006.01)
(52) U.S. Cl. .................... 709/220; 709/223; 709/224
(58) Field of Classification Search .................. 709/223, 709/224, 220, 221, 245, 219, 222, 225, 226
See application file for complete search history.

(56) References Cited

U.S. PATENT DOCUMENTS

| | | | | |
|---|---|---|---|---|
| 6,009,103 | A * | 12/1999 | Woundy | 370/401 |
| 6,324,577 | B1 | 11/2001 | Hirai | |
| 6,564,216 | B2 * | 5/2003 | Waters | 1/1 |
| 6,697,360 | B1 * | 2/2004 | Gai et al. | 370/389 |
| 7,254,630 | B1 * | 8/2007 | Daude et al. | 709/224 |
| 2002/0010767 | A1 * | 1/2002 | Farrow et al. | 709/223 |
| 2002/0052876 | A1 * | 5/2002 | Waters | 707/100 |

(Continued)

FOREIGN PATENT DOCUMENTS
WO 9933211 7/1999

OTHER PUBLICATIONS
European Office Action dated Jul. 18, 2005 issued in European Application No. 99 480 077.9-2413.

(Continued)

*Primary Examiner* — Barbara Burgess
(74) *Attorney, Agent, or Firm* — Mark Vallone; Roberts Mlotkowski Safran & Cole, P.C.

(57) ABSTRACT

A method and system for monitoring and optimizing performance and availability of a Dynamic Host Configuration Protocol (DHCP) service provided by one or a plurality of DHCP servers (602) in an Internet Protocol (IP) network comprising one or a plurality of IP subnetworks. The method comprises in a DHCP server (602) defining one or a plurality of groups of subnetworks, a group of subnetworks comprising one or a plurality of subnetworks; retrieving information related to resources, in particular IP addresses, allocated within said DHCP server to each group of subnetworks; transferring said information to a DHCP service monitoring system (600). The method comprises in a DHCP service monitoring system (403) retrieving (501 to 505) from one or a plurality of DHCP servers (401), information related to resources, in particular IP addresses, allocated within each DHCP server (401) to groups of subnetworks, each group of subnetworks comprising one or a pluarlity of subnetworks and aggregating (506 to 511) the information for each group of subnetworks.

27 Claims, 6 Drawing Sheets

U.S. PATENT DOCUMENTS

2002/0165972 A1  11/2002  Chien et al.

OTHER PUBLICATIONS

"IP AddressWorks", Onsight Solutions, Online! 1998 XP002129978, Retrieved from the Internet: URL:http://www.ipworks.nl/ipaw-spd.htm, the whole document.

Droms R: "Automated Configuration of TCP/IP with DHCP" IEEE Internet Computing, Jul.-Aug. 1999, IEEE, USA, vol. 3, No. 4, pp. 45-53, XP000874503, ISSN: 1089-7801, the whole document.

Notice of Allowance dated Apr. 10, 2007, in U.S. Appl. No. 09/455,196.

* cited by examiner

DHCP Server Application

METHOD AND SYSTEM FOR OPTIMIZING PERFORMANCE AND AVAILABILITY OF A DYNAMIC HOST CONFIGURATION PROTOCOL (DHCP) SERVICE

CROSS-REFERENCE TO RELATED APPLICATIONS

The present application is a continuation of U.S. application Ser. No. 09/455,196 filed Dec. 6, 1999, the disclosure of which is expressly incorporated by reference herein in its entirety. The present application also claims priority under 35 U.S.C. §119 of French Patent Application No. 98480077.9, filed on Aug. 20, 1999.

TECHNICAL FIELD OF THE INVENTION

The present invention relates to computer networks, and more particularly to a method and system in an Internet Protocol (IP) network for optimizing performance and availability of a Dynamic Host Configuration Protocol (DHCP) service provided by a plurality of DHCP servers.

BACKGROUND ART

Internet

Internet is a global network of computers and computer networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). The TCP/IP protocol supports three basic applications on the Internet:

- transmitting and receiving electronic mail,
- logging into remote computers ("Telnet"), and
- transferring files and programs from one computer to another ("FTP" or "File Transfer Protocol").

One of the objects of TCP/IP is to interconnect networks and to provide universal communication services via an internetwork, or Internet. Each physical network has its own technology-dependent communication interface, in the form of a programming interface that provides basic communication functions (primitives). Communication services are provided by software that runs between the physical network and user applications. This software provides a common interface for these applications, independent of the underlying physical network. The architecture of the physical networks is hidden from the user.

The Internet protocol is still evolving through the mechanism of Request For Comments (RFC). New protocols (mostly application protocols) are designed and implemented by researchers. They are brought to the attention of the Internet community in the form of an Internet Draft (ID). The largest source of IDs is the Internet Engineering Task Force (IETF).

IP Addresses

To interconnect two networks, a computer system able to forward packets from one network to the other is attached to both networks. Such a machine is called a router. The term "IP router" is also used because the routing function is part of the IP layer of the TCP/IP protocol.

IP addresses are used by the IP protocol to uniquely identify a host on the Internet. Strictly speaking, an IP address identifies an interface that is capable of sending and receiving-IP datagrams; one system can have multiple such interfaces. However, both hosts and routers must have at least one IP address, so this simplified definition is acceptable. IP datagrams (the basic data packets exchanged between hosts) are transmitted by a physical network attached to the host and each IP datagram contains a source IP address and a destination IP address.

IP addresses are represented by a 32-bit unsigned binary value which is usually expressed in a dotted decimal format. For example, 9.167.5.8 is a valid Internet address. The numeric form is used by the IP software. The mapping between the IP address and an easier-to-read symbolic name, for example myhost.ibm.com, is done by the Domain Name System IP Subnets Due to the explosive growth of the Internet, the principle of assigned IP addresses became too inflexible to allow easy changes to local network configurations. Those changes might occur when:

- A new type of physical network is installed at a location.
- Growth of the number of hosts requires splitting the local network into two or more separate networks.
- Growing distances require splitting a network into smaller networks, with gateways between them.

To avoid having to request additional IP network addresses in these cases, the concept of subnets was introduced. The assignment of subnets can be done locally, as the whole network still appears to be one IP network to the outside world.

The host number part of the IP address is subdivided again into a network number and a host number. This second network is termed a subnetwork or subnet. The main network now consists of a number of subnets and the IP address is interpreted as:

<network number><subnet number><host number>

The combination of the subnet number and the host number is often termed the local address or the local part. Subnetting is implemented in a way that is transparent to remote networks. A host within a network that has subnets is aware of the subnetting but a host in a different network is not; it still regards the local part of the IP address as a host number.

The division of the local part of the IP address into subnet number and host number parts can be chosen freely by the local administrator; any bits in the local part can be used to form the subnet. The division is done using a subnet mask which is a 32 bit number. Zero bits in the subnet mask indicate bit positions ascribed to the host number, and ones indicate bit positions ascribed to the subnet number. The bit positions in the subnet mask belonging to the network number are set to ones but are not used. Subnet masks are usually written in dotted decimal form, like IP addresses.

Domain Names

The host or computer names (like www.entreprise.com) are translated into numeric Internet addresses (like 194.56.78.3), and vice versa, by using a method called DNS ("Domain Name Service"). DNS is supported by network-resident servers, also known as domain name servers or DNS servers.

Dynamic IP

There are generally three pieces of information needed by a system to be able to communicate on a TCP/IP network:

- an IP address (to uniquely identify the system on the network),
- a subnet mask (to determine the network and subnet parts of the address), and
- the address of at least one router (if the system is to be able to communicate with other devices outside of its immediate subnet).

These three values represent the bare minimum of information that must be programmed into each and every device for participating in the TCP/IP world. Often the number of necessary parameters will be much higher. With the exponential growth rate of networking today, it is easy to see that manual programming of these values into every device that is to attach to the network represents a major administrative workload.

The increasingly mobile nature of the end users also raises problems with regard to configuration of network devices. It is possible to allocate multiple sets of configuration parameters to a device, but:

this obviously means even more workload for the administrator, this is wasteful with respect to the number of IP addresses allocated.

Several components of TCP/IP help automate device configuration, reduce the number of IP addresses allocated, and/or cope with the demands of the mobile user.

Bootstrap Protocol (BOOTP)

The BOOTP protocol was originally developed as a mechanism to enable diskless hosts to be remotely booted over a network as workstations, routers, terminal concentrators and so on. It allows a minimum IP protocol stack with no configuration information to obtain enough information to begin the process of downloading the necessary boot code. BOOTP does not define how the downloading is done, but this process typically uses TFTP "Trivial File Transfer Protocol (TFTP)" as described in RFC 906—Bootstrap Loading Using TFTP. Although still widely used for this purpose by diskless hosts, BOOTP is also commonly used solely as a mechanism to deliver configuration information to a client that has not been manually configured. The BOOTP process involves the following steps:

1. The client determines its own hardware address; this is normally in a ROM (Read Only Memory) on the hardware.

2. A BOOTP client sends its hardware address in a UDP (User Datagram Protocol) datagram to the server. If the client knows its IP address and/or the address of the server, it should use them, but in general BOOTP clients have no IP configuration data at all. If the client does not know its own IP address, it uses 0.0.0.0. If the client does not know the server's IP address, it uses the limited broadcast address (255.255.255.255). The UDP port number is 67.

3. The server receives the datagram and looks up the hardware address of the client in its configuration file, which contains the client's IP address. The server fills in the remaining fields in the UDP datagram and returns it to the client using UDP port 68.

4. When it receives the reply, the BOOTP client will record its own IP address and begin the bootstrap process.

BOOTP is a draft standard protocol. Its status is recommended. The BOOTP specifications can be found in RFC 951—Bootstrap Protocol. There are also updates to BOOTP, some relating to interoperability with DHCP (Dynamic Host Configuration Protocol), described in RFC 1542—Clarifications and Extensions for the Bootstrap Protocol, which updates RFC 951 and RFC 2132—DHCP Options and BOOTP Vendor Extensions.

Dynamic Host Configuration Protocol (DHCP)

The Dynamic Host Configuration Protocol (DHCP) provides a framework for passing configuration information to hosts on a TCP/IP network. DHCP is based on the BOOTP protocol, adding the capability of automatic allocation of reusable network addresses and additional configuration options. DHCP messages use UDP port 67, the BOOTP server's well-known port and UDP port 68, the BOOTP client's well-known port. DHCP consists of two components:

1. A protocol that delivers host-specific configuration parameters from a DHCP Server to a host.

2. A mechanism for the allocation of temporary or permanent network addresses to hosts.

IP requires the setting of many parameters within the protocol implementation software. Because IP can be used on many dissimilar kinds of network hardware, values for those parameters cannot be guessed at or assumed to have correct default values. The use of a distributed address allocation scheme based on a polling/defence mechanism; for discovery of network addresses already in use, cannot guarantee unique network addresses because hosts may not always be able to defend their network addresses. DHCP supports three mechanisms for IP address allocation:

1. Automatic allocation: DHCP assigns a permanent IP address to the host.

2. Dynamic allocation: DHCP assigns an IP address for a limited period of time.

3. Manual allocation: The host's address is assigned by a network administrator.

DHCP is a draft standard protocol. Its status is elective. The current DHCP specifications can be found in RFC 2131—Dynamic Host Configuration Protocol and RFC 2132—DHCP Options and BOOTP Vendor Extensions.

Configuration Parameters Repository

DHCP provides persistent storage of network parameters for network clients. A DHCP Server stores a key-value entry for each client, the key being some unique identifier, for example an IP subnet number and a unique identifier within the subnet (normally a hardware address), and the value contains the configuration parameters last allocated to this particular client.

One effect of this is that a DHCP client will tend to always be allocated the same IP address by the server, provided the pool of addresses is not over-subscribed and the previous address has not already been allocated to another client.

DHCP Considerations

DHCP dynamic allocation of IP addresses and configuration parameters relieves the network administrator of great deal of manual configuration work. The ability for a device to be moved from network to network and to automatically obtain valid configuration parameters for the current network can be of great benefit to mobile users. Also, because IP addresses are only allocated when clients are actually active, it is possible, by the use of reasonably short lease times and the fact that mobile clients do not need to be allocated more than one address, to reduce the total number of addresses in use in an organization. However, the following should be considered when DHCP is being implemented:

DHCP is built on UDP, which is, as yet, inherently insecure. In normal operation, an unauthorized client could connect to a network and obtain a valid IP address and configuration. To prevent this, it is possible to preallocate IP addresses to particular MAC (Medium Access Control) addresses (similar to BOOTP), but this increases the administration workload and removes the benefit of recycling of addresses.

Unauthorized DHCP Servers could also be set up, sending false and potentially disruptive information to clients.

In a DHCP environment where automatic or dynamic address allocation is used, it is generally not possible to predetermine the IP address of a client at any particular point in time. In this case, if static DNS (Domain Name Server) servers are also used, the DNS servers will not likely contain valid host name to IP address mappings for the clients. If having client entries in the DNS is important for the network, one may use DHCP to manually assign IP addresses to those clients and then administer the client mappings in the DNS accordingly.

BOOTP and DHCP Interoperability

The format of DHCP messages is based on the format of BOOTP messages, which enables BOOTP and DHCP clients to interoperate in certain circumstances. Support for BOOTP clients at a DHCP Server must be configured by a system administrator, if required.

Dynamic Domain Name System

In order to take advantage of DHCP, yet still to be able to locate any specific host by means of a meaningful label, such as its host name, the following extensions to the Domain Name System (DNS) are required:

A method for the host name to address mapping entry for a client in the domain name server to be updated, once the client has obtained an address from a DHCP Server.

A method for the reverse address to host name mapping to take place once the client obtains its address.

Updates to the DNS to take effect immediately, without the need for intervention by an administrator.

Updates to the DNS to be authenticated to prevent unauthorized hosts from accessing the network and to stop imposters from using an existing host name and remapping the address entry for the unsuspecting host to that of its own.

A method for primary and secondary DNS servers to quickly forward and receive changes as entries are being updated dynamically by clients In short, a secure Dynamic Domain Name System (DDNS) is necessary.

In summary, in the DHCP and DDNS environment, DHCP provides a device with a valid IP address for the point at which it is attached to the network. DDNS provides a method of locating that device by its host name, no matter where that device happens to be attached to a network and what IP address it has been allocated.

More explanations about the domain presented in the above sections can be found in the following publications incorporated herewith by reference:

TCP/IP Tutorial and Technical Overview by Martin W. Murhammer, Orcun Atakan, Stefan Bretz, Larry R. Pugh, Kazunari Suzuki, David H. Wood published by IBM International Technical Support Organization.

"Internet in a nutshell" by Valerie Quercia, published by O'Reilly, October 1997.

Problem

The problem is to monitor the utilization of a Dynamic Host Configuration Protocol (DHCP) service provided by one or a plurality of DHCP servers to optimally adjust configuration parameters. Due to the nature of DHCP protocol which is based on UDP BOOTP broadcast, the DHCP service is provided to the DHCP Client by the "fastest" DHCP Server to answer. As a consequence, in a multiple DHCP Servers environment, when a DHCP Server fails or when a DHCP Server reaches its maximum capacity, the DHCP Servers which are still available continue to provide a DHCP Service and to answer DHCP Client requests. The available DHCP Servers continue to provide the service until they reach their maximum capacity. Eventually the DHCP Service may fail because available DHCP Servers cannot support the total load.

A single DHCP Server may be configured to provide a DHCP Service to multiple subnetworks or groups of subnetworks. In this case, the DHCP Server is configured with one pool of IP addresses per subnetwork. The capacity or size of a pool is defined by the number of IP addresses this pool can manage.

In addition, for better resilience and better performance, a group of subnetworks can be administered by multiple DHCP Servers. In this case, the DHCP Service is provided by this plurality of DHCP Servers.

Note: in the present invention, "a group of subnetworks" comprises one or multiple subnetworks, also called "IP subnets", generally located in a same geographical area.

The problems are then to:
1. monitor the utilization of the DHCP Service for each group of subnetworks;
2. monitor the pools of IP addresses configured within each DHCP Server;
3. correlate and monitor for each group of subnetworks, the utilization of the pools of IP addresses configured on multiple DHCP Servers;
4. detect any capacity problem on DHCP Servers to anticipate any DHCP Service degradation or disruption.

The DHCP Service provided when one DHCP Server has reached its maximum capacity is degraded because the DHCP Servers that are still available have to handle additional load. The monitoring of a DHCP Service without analysis of its utilisation cannot lead to an efficient anticipation of the problems, in particular disruption or degradation of the DHCP Service.

OBJECTS OF THE INVENTION

One object of the present invention is to provide a method for optimizing performance and availability of a DHCP Service.

It is a further object of the present invention to monitor the utilisation of a DHCP Service for each group of subnetworks.

It is another object of the present invention to monitor the pools of IP addresses configured within each DHCP Server.

It is yet another object of the present invention to correlate and monitor the utilization of the pools of IP addresses configured on multiple DHCP Servers for each group of subnetworks.

It is yet another object of the present invention to detect any capacity problem on DHCP Servers.

It is another object of the present invention to check that every DHCP Server is correctly configured.

SUMMARY OF THE INVENTION

The present invention discloses a method and system for monitoring and optimizing performance and availability of a Dynamic Host Configuration Protocol (DHCP) service provided by one or a plurality of DHCP servers in an Internet Protocol (IP) network comprising one or a plurality of IP subnetworks.

More particularly, the present invention uses specific probes for collecting information related to the utilization of IP address pools within said DHCP Servers.

The present invention also uses a DHCP Service Utilisation application for correlating the information related to the utilization of the IP address pools, and providing monitoring reports and statistics.

The method comprises in a DHCP server the steps of:
defining one or a plurality of groups of subnetworks, each group of subnetworks comprising one or a plurality of subnetworks;
retrieving information related to resources, in particular IP addresses, allocated within said DHCP server to each group of subnetworks;
transferring said information to a DHCP service monitoring system.

The method comprises in a DHCP service monitoring system the steps of:

retrieving from one or a plurality of DHCP servers, information related to resources, in particular IP addresses, allocated within each DHCP server to groups of subnetworks, each group of subnetworks comprising one or a plurality of subnetworks;

aggregating the information for each group of subnetworks.

The present invention provides the following advantages:

Early detection of IP address shortage in pools configured within each DHCP Server for each group of subnetworks.

Early detection of IP address shortage in pools configured on multiple DHCP Servers for each group of subnetworks.

Early detection of any capacity problem on DHCP Servers for each group of subnetworks to anticipate any service degradation or disruption.

Production of DHCP Service utilisation reports, for adjusting configuration of DHCP Servers (for example, increase of the size of an IP address pool for a specific group of subnetworks on a DHCP Server).

No additional or specific hardware is mandatory.

DRAWINGS

The novel and inventive features believed characteristic of the invention are set forth in the claims. The invention itself, however, as well as a preferred mode of use, further objects and advantages thereof, will best be understood by reference to the following detailed description of an illustrative, detailed embodiment when read in conjunction with the accompanying drawings, wherein:

PREFERRED EMBODIMENT OF THE INVENTION

The present invention relates to the monitoring of a DHCP service and more particularly to a method and system for checking the size of IP address pools for a group of IP subnetworks among one or a plurality of DHCP servers. The present invention is based on the measure of utilization of IP address pools by means of probes.

IP Address Allocation

Figure 1:
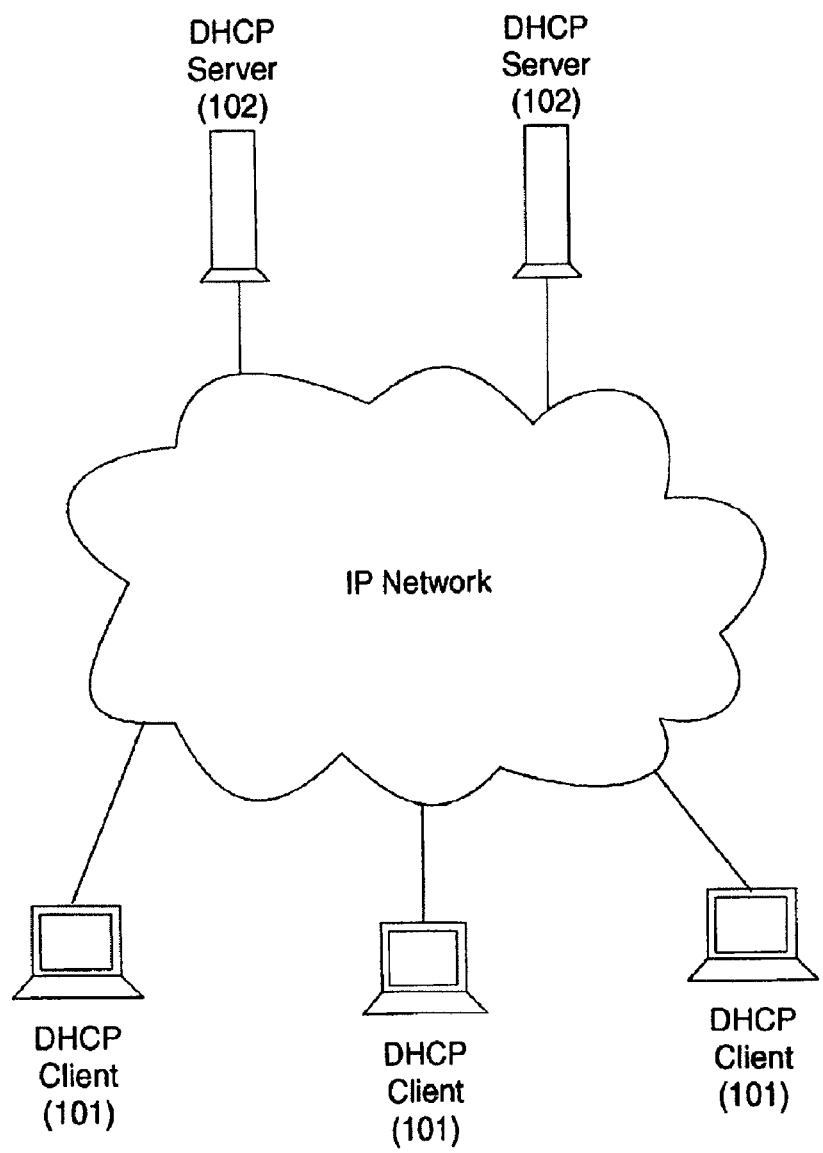
FIG. 1 shows the IP address allocation to a DHCP Client by a DHCP Server according to prior art.

FIG. 1 describes the DHCP Client/Server interactions when the DHCP Client does not know its network address. More particularly, FIG. 1 shows the acquisition mechanism by a DHCP Client of the IP address and the IP minimal configuration parameters from a DHCP Server within an IP network. The DHCP Client (101) broadcasts a request on its local physical subnet (103). The request is forwarded by any router having a BOOTP forwarding mechanism. When the request is received by a DHCP Server (102), the DHCP Server checks whether it is able to answer the DHCP Client or not. If the DHCP Server has still some available IP address within its address database, a positive answer is returned to the DHCP Client. The DHCP Client selects the first DHCP Server for which a positive answer is received and confirms to this server its agreement.

More particularly the allocation of a new network address comprises the following steps:

The DHCP Client broadcasts a request on its local physical subnet. The request may include some options such as network address suggestion or lease duration.

Each DHCP Server may respond with a message that includes an available network address and other configuration options. The DHCP Server may record the address as offered to the DHCP Client to prevent the same address being offered to other DHCP Clients in the event of further messages being received before the first DHCP Client has completed its configuration.

The DHCP Client receives one or more messages from one or more DHCP Servers. The DHCP Client chooses one based on the configuration parameters offered and broadcasts a message that includes the DHCP Server identifier option to indicate which message it has selected and the requested IP address option, taken from the DHCP Client IP address in the selected offer.

The DHCP Servers receive the messages broadcasted by the DHCP Client. Those DHCP Servers not selected use the message as notification that the DHCP Client has declined that DHCP Server's offer. The DHCP Server selected in the message commits the binding for the DHCP Client to persistent storage and responds with a message containing the configuration parameters for the requesting DHCP Client.

The DHCP Client receives the message with configuration parameters and performs a final check on the parameters. At this point the DHCP Client is configured.

Internal View of a DHCP Server Probe

Figure 2:
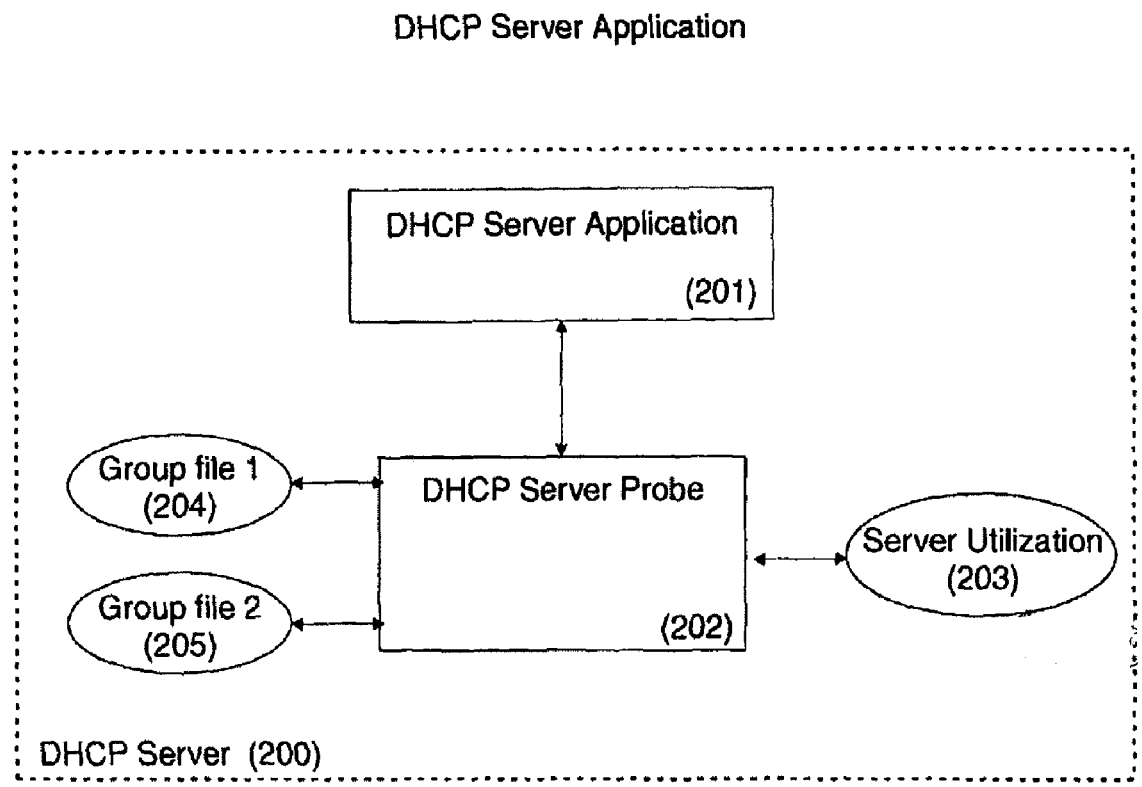
FIG. 2 is a view of a DHCP server probe according to the present invention.

FIG. 2 is a logical view of a DHCP Server Probe (202). The DHCP Server Probe runs concurrently with the DHCP Server application (201). The DHCP Server Probe (202) within the DHCP Server (200) determines, the current number of allocated IP addresses for each group of subnetworks and saves this information in a file (203) called "Server Utilisation File" (in a preferred embodiment, there is one entry in the Server Utilisation File for each group of subnetworks). A group of subnetworks is in fact a list of IP subnetworks (or IP subnets) stored in a file (204) generally called "Group File" (in a preferred embodiment, the file name is the group name for a better identification of the information). A workstation broadcasting an IP address allocation request from its local subnetwork, will be served by a unique DHCP Server. The Group File (204) in a DHCP Server comprises in fact the list of IP subnetworks belonging to a same group.

Dynamic View of a DHCP Server Probe

Figure 3:
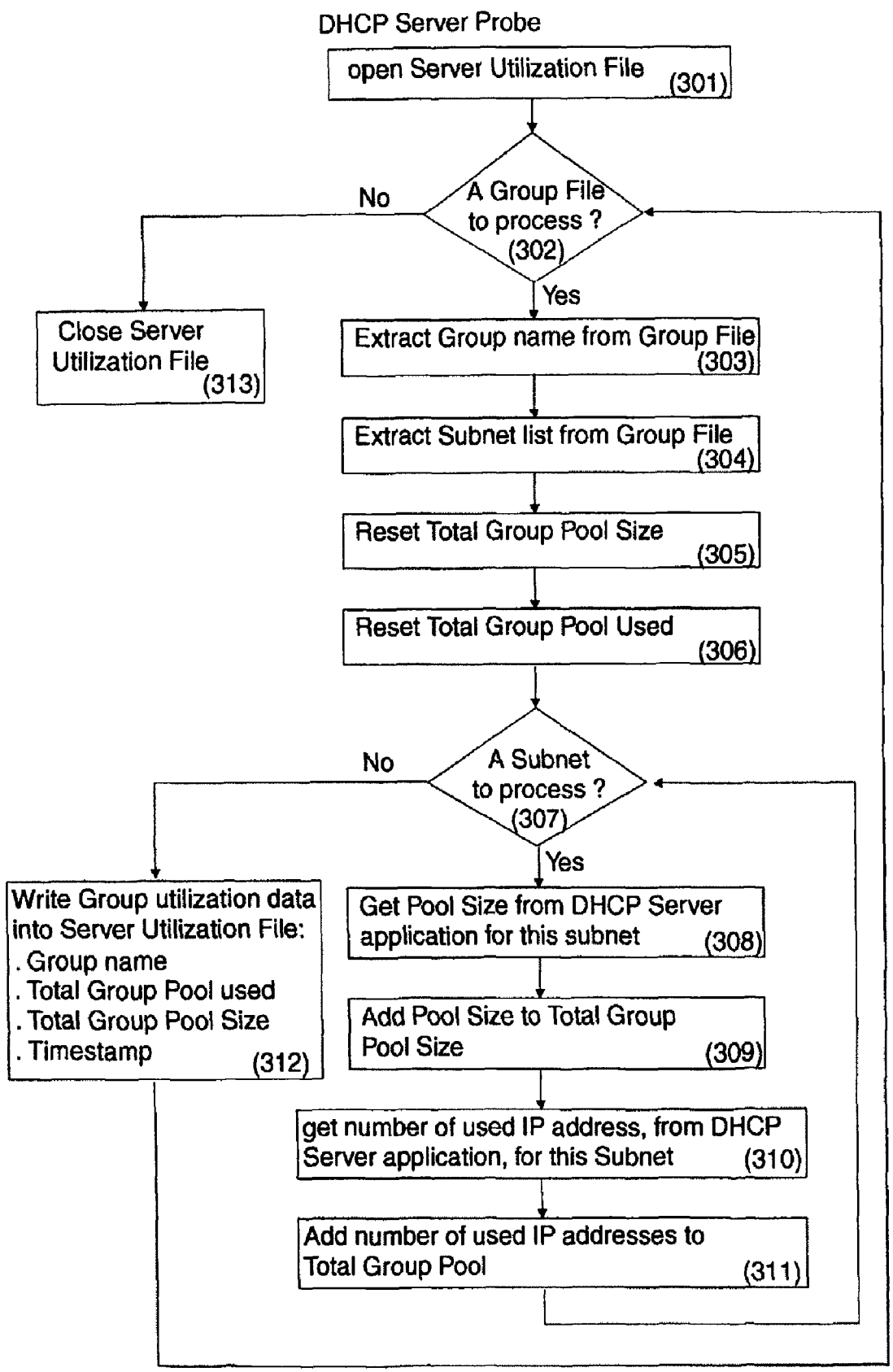
FIG. 3 is a flow chart of a DHCP server probe according to the present invention.

FIG. 3 is a flow chart of a DHCP Server Probe as described in FIG. 2. The DHCP Server Probe is executed at given and regular periods of time. Information collected by the probe is recorded in a file (Server Utilisation File—203) containing for each group of subnetworks, the total number of IP addresses within the pool and the number of IP addresses used or allocated. The process comprises the following steps:

(301) The Server Utilization File in the DHCP Server is opened.

(302) A test determines whether there is a Group File to process or not.

(313) If there are no more Group Files to process, the Server Utilization File in the DHCP Server is closed.

If there is still a Group File to process:

(303) The group name is extracted from the Group File (in a preferred embodiment the group name is extrapolated from the Group File name).

(304) The list of subnetworks that belongs to the group is extracted from the Group File.

(305) A first counter called "Total Group Pool Size counter" is initialized for the group. This counter is used to determine the total number of IP addresses that can be allocated to this group (available and allocated IP addresses).

(306) A second counter called "Total Group Pool Used counter" is initialized for the group. This counter is used to determine the total number of IP addresses actually allocated to this group.

(307) A test determines whether there is a subnetwork within the group to process or not.

If there is a subnetwork to process:

(308) The size of the pool associated with the subnetwork is retrieved from the DHCP Server Application.

(309) The size of the pool is added to the Total Group Pool Size stored in the Total Group Pool Size counter.

(310) The number of allocated IP addresses associated with the subnetwork is retrieved from the DHCP Server Application.

(311) The number of allocated IP addresses is added to the Total Group Pool Used stored in the Total Group Pool Used counter.

When all subnetworks have been processed:

(312) The Server Utilisation File is updated with the following information:
name of the group;
Total Group Pool Used;
Total Group Pool Size;
a time stamp.

DHCP Group Probe

Figure 4:
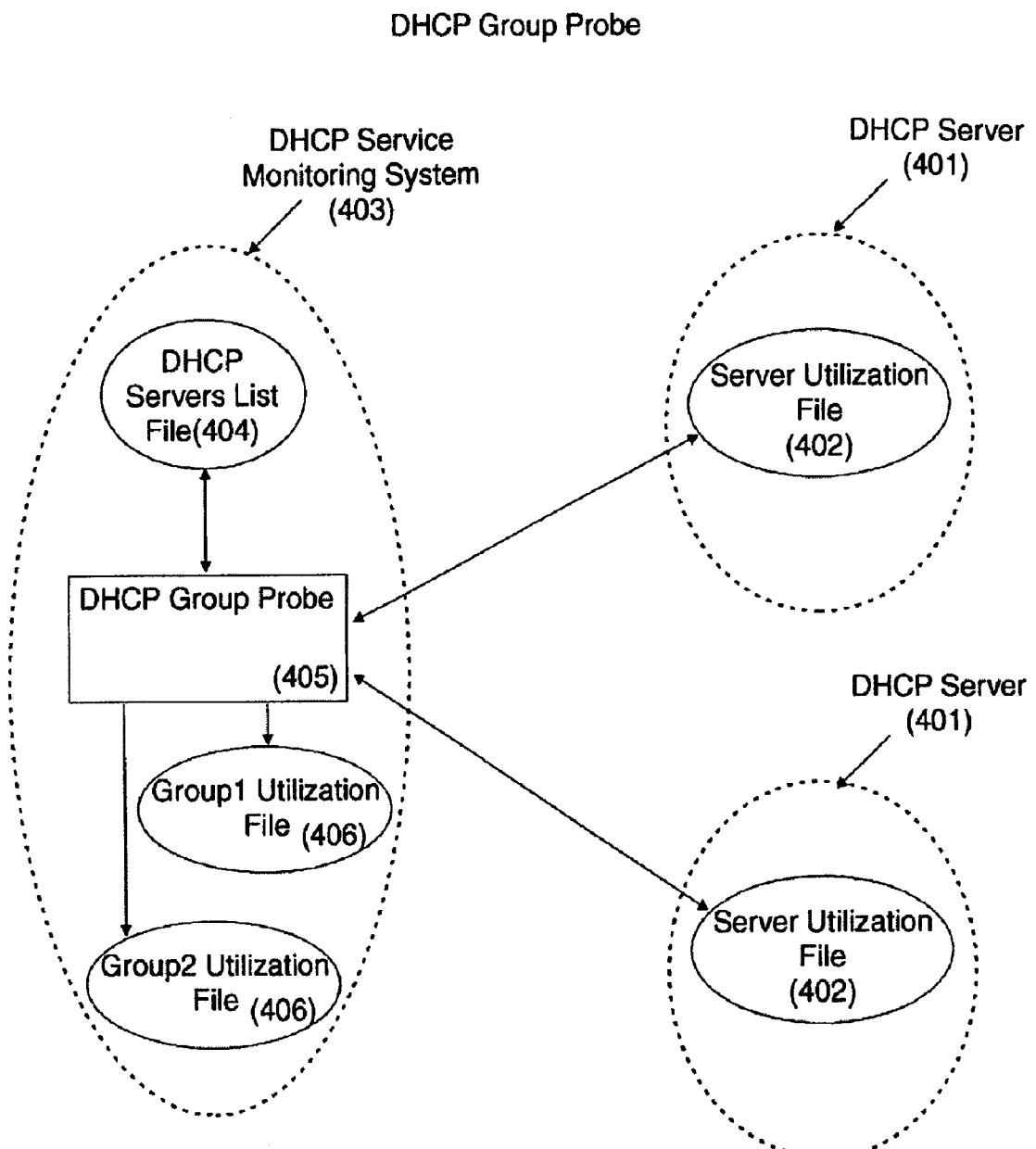
FIG. 4 is a view of a DHCP group probe according to the present invention.

FIG. 4 is a view of a DHCP Group Probe (405). The probe can be processed either in a DHCP Monitoring System (403) or in any DHCP Server. The purpose of a DHCP Group Probe is to compute for each group of subnetworks administered by one or a plurality of DHCP Servers, the global utilisation of the IP address pools. The DHCP Group Probe collects the information previously processed by DHCP Server Probes on DHCP Servers (401).

The information is stored in the Server Utilization File (402) of each DHCP Server (401) administering the group.

DHCP Servers are recorded in a list called "DHCP Servers List File" (404). The collected information is then aggregated in several files (one per group) called "Group Utilisation Files" (406). Each file contains all information related to the utilization of IP address pools for a given group, in particular the percentage of utilisation of IP addresses. To avoid any IP address shortage in IP address pools, specific actions (for instance, increase of a pool size in a DHCP Server) can then be launched if, for instance, the computed percentage exceeds a predefined threshold.

Dynamic View of a DHCP Group Probe

Figure 5:
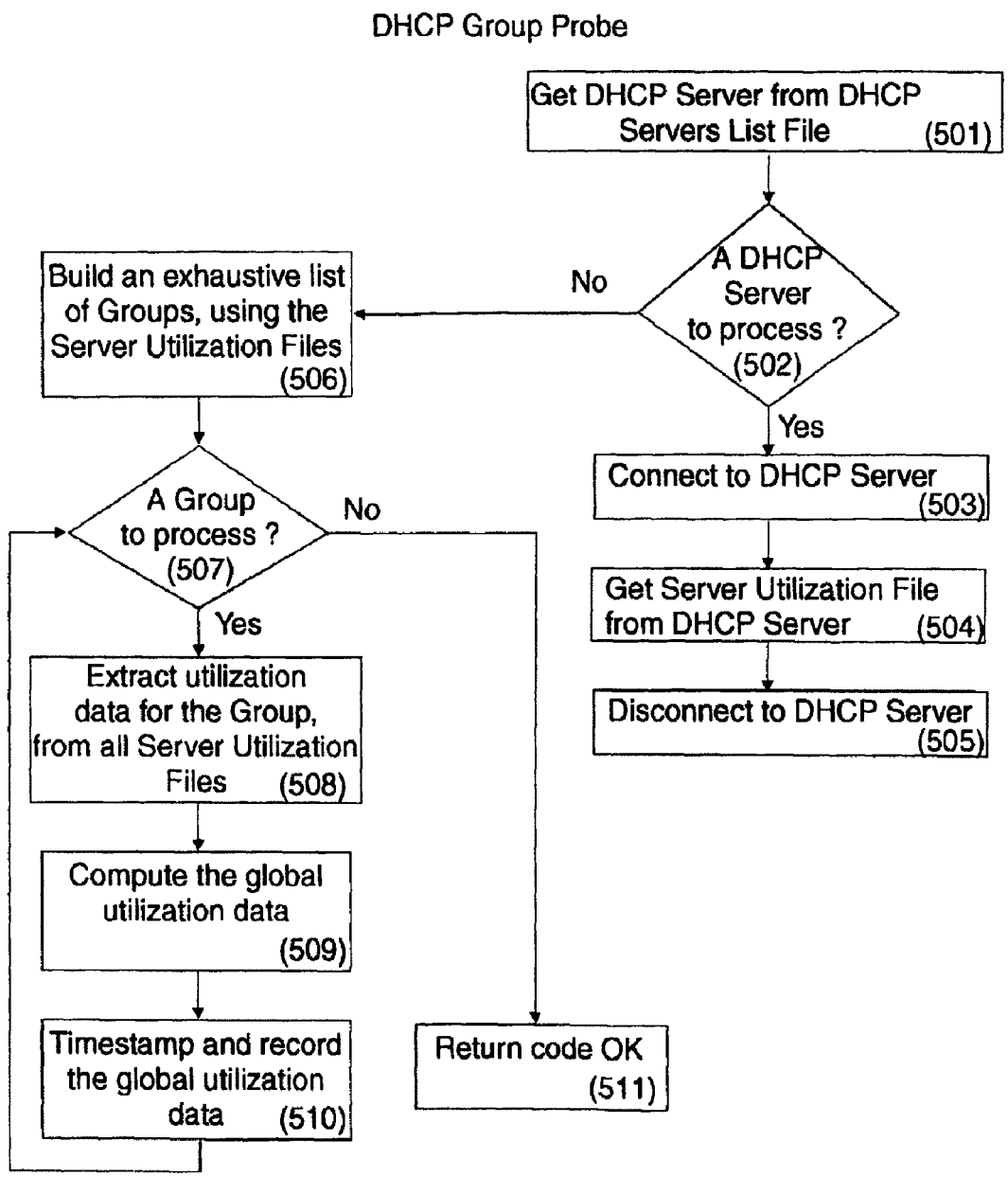
FIG. 5 is a flow chart of a DHCP group probe according to the present invention.

FIG. 5 is a flow chart of a DHCP Group Probe. The probe is preferably executed at given and regular periods of time. The information for each group of subnetworks is collected in the different DHCP Servers. A file (404) in the DHCP Monitoring System (403) contains an exhaustive list of the DHCP Servers administering each group of subnetworks. The following process in the DHCP Monitoring System (403) is then executed:

(501) A DHCP Server (in a preferred embodiment, the DHCP Server name, or address) is retrieved from the DHCP Servers List File (404).

(502) A test determines whether there is still a DHCP Server to process or not. If there is a DHCP Server to process:

(503) A connection is established with the DHCP Server (401).

(504) The Server Utilisation File (402) is retrieved from the DHCP Server.

(505) The connection with the DHCP Server is terminated.

When there is no more DHCP Server to process:

(506) An exhaustive list of the groups is extrapolated from the Server Utilisation Files previously retrieved from DHCP Servers (note each Server Utilisation File contains group names, and a same group name may be present in multiple Server Utilisation Files).

(507) A test determines whether there is still a group to process or not:

If there is still a group to process:

(508) Data for the group (Total Group Pool Used, Total Group Pool Size) are retrieved from Server Utilisation Files.

(509) The global utilization of the IP address pools for the group is computed. In a preferred embodiment, the global utilisation is equal to sum of Total Group Pool Used variables, divided by sum of all Total Group Pool Size variables.

An action (for instance an alert) can be sent if a predefined threshold has been reached for this group.

(510) The global utilisation of the IP address pools for the group is recorded with a time stamp.

(511) When there are no more groups to process, a successful return code is returned.

DHCP Service Monitoring System

Figure 6:
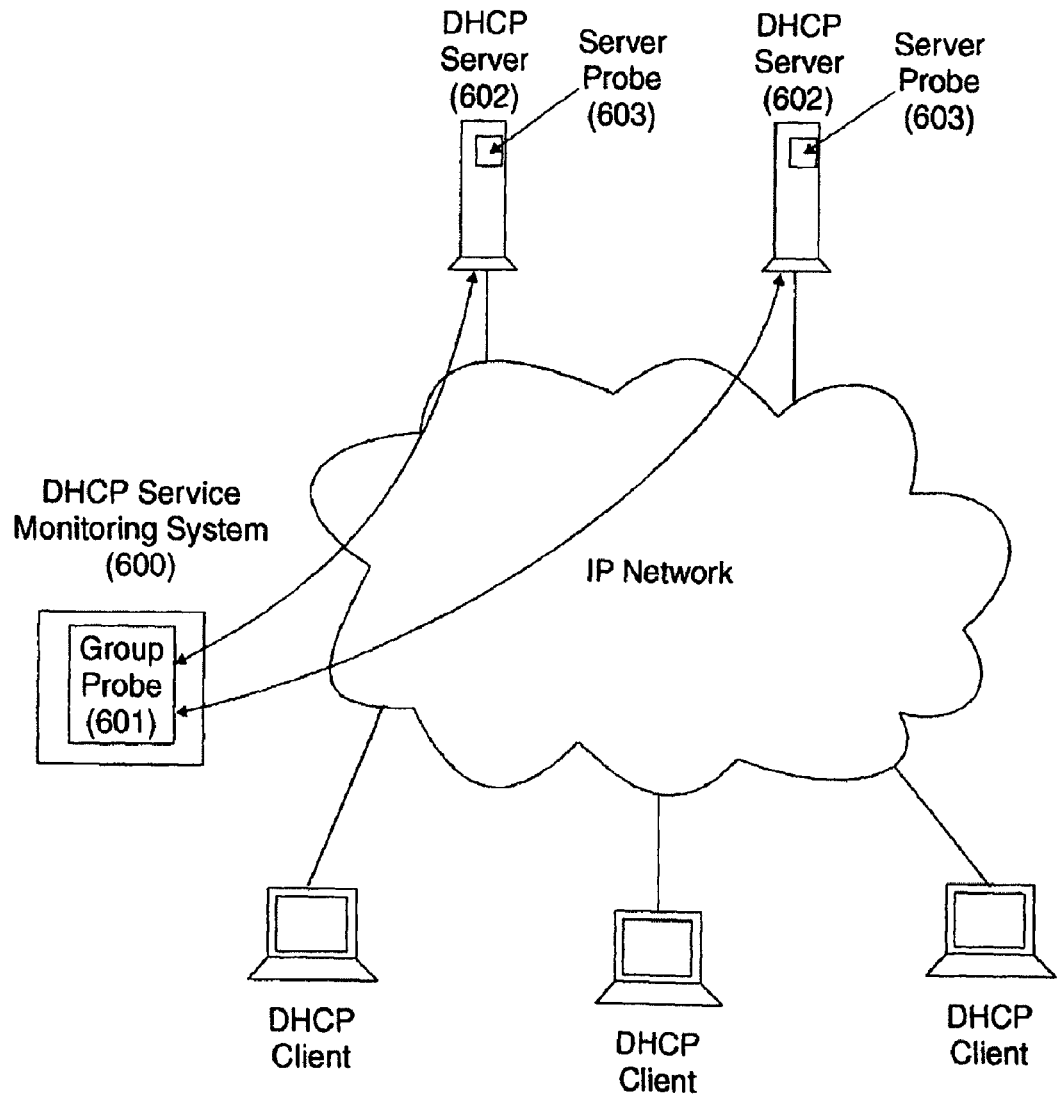
FIG. 6 is a physical view of a DHCP service monitoring system according to the present invention.

FIG. 6 is a view of a DHCP Service Monitoring system (600) within an IP network. A dedicated computer system can be used to run the DHCP Group Probes (601) and to collect the information located in each DHCP server (602) by DHCP Server Probes (603).

While the invention has been particularly shown and described with reference to a preferred embodiment, it will be understood that various changes in form and detail may be made therein without departing from the spirit, and scope of the invention.

What is claimed:

1. A method for monitoring and optimizing performance and availability of a Dynamic Host Configuration Protocol (DHCP) service provided by one or a plurality of DHCP servers in an Internet Protocol (IP) network comprising one or a plurality of IP subnetworks, said method comprising in a DHCP server the steps of:

defining, by a processor, one or a plurality of groups of subnetworks, each group of subnetworks comprising one or a plurality of subnetworks;

retrieving information related to resources, in particular IP addresses, allocated within said DHCP server to each group of subnetworks; and transferring said information to a DHCP service monitoring system, said DHCP service monitoring system comprising means for retrieving said information from the one or the plurality of DHCP servers and means for aggregating said information for each group of subnetworks, wherein the performance and availability of the DHCP service is monitored and optimized based on information aggregated for each group of subnetworks, wherein the means for aggregating said information for each group of subnetworks comprises determining a global utilization for each group of subnetworks, the global utilization being equal to a total number of IP addresses presently allocated to a group of subnetworks on all DHCP servers, divided by a total number of IP addresses that can be potentially allocated to said group of subnetworks on all DHCP servers, and wherein the monitoring and optimizing of the performance and availability of the DHCP service, comprises sending an action if the global utilization for said group of subnetworks reaches a predetermined threshold.

2. The method according to claim 1 wherein the step of retrieving information related to resources allocated to each group of subnetworks comprises the further step of:
    determining a total number of IP addresses presently allocated to each group of subnetworks, the total number of IP addresses of a group of subnetworks being equal to the sum of IP addresses presently allocated to each network defined within said group of subnetworks.

3. The method according to claim 2 wherein the step of retrieving information related to resources allocated to each group of subnetworks comprises the further step of:
    determining a total number of IP addresses that can be potentially allocated to each group of subnetworks, the total number of IP addresses of a group of subnetworks being equal to the sum of the IP addresses that can be potentially allocated to each subnetwork defined within said group of subnetworks.

4. The method according to claim 3 comprising the further step of:
    storing the total number of IP addresses presently allocated to each group and/or that can be potentially allocated to each group of subnetworks in a file within the DHCP server.

5. The method according to claim 4, wherein the method includes a group of subnetworks administered by multiple DHCP Servers.

6. The method according to claim 5, wherein the monitoring and optimizing performance and availability includes preventing any DHCP server from reaching its maximum capacity.

7. The method according to claim 6, wherein the monitoring and optimizing performance and availability includes calculating a global utilization, wherein the global utilization is equal to a sum of IP addresses that can be potentially allocated to said group of subnetworks in each DHCP server divided by a sum of the total number of IP addresses presently allocated to said group of subnetworks on all DHCP servers.

8. The method according to claim 7, wherein the monitoring and optimizing performance and availability includes increasing the size of a pool size in the DHCP server.

9. The method according to claim 1, wherein the method optimally adjusts configuration parameters.

10. The method according to claim 1, further comprising collecting information related to utilization of IP address pools within the one or a plurality of DHCP servers using probes.

11. The method according to claim 10, wherein the probes are located on the DHCP server the probes collect information on.

12. The method according to claim 1, further comprising measuring utilization of IP address pools using probes.

13. The method according to claim 1, further comprising recording the global utilization for said group of subnetworks with a time stamp.

14. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

15. A computer program product comprising one or more computer-readable, tangible storage devices and computer-readable program instructions which are stored on the one or more storage devices and when executed by one or more processors, perform the method of claim 1.

16. A method for monitoring and optimizing performance and availability of a Dynamic Host Configuration Protocol (DHCP) service provided by one or a plurality of DHCP servers in an Internet Protocol (IP) network comprising one or a plurality of IP subnetworks, said method comprising in a DHCP service monitoring system the steps of:
    retrieving from the one or a plurality of DHCP servers, information related to resources, in particular IP addresses, allocated within each DHCP server to groups of subnetworks, each group of subnetworks comprising one or a plurality of subnetworks;
    aggregating said information for each group of subnetworks; and
    monitoring and optimizing performance and availability of the DHCP service based on the information aggregated for each group of subnetworks,
    wherein the aggregating said information for each group of subnetworks comprises determining a global utilization for each group of subnetworks, the global utilization being equal to a total number of IP addresses presently allocated to a group of subnetworks on all DHCP servers, divided by a total number of IP addresses that can be potentially allocated to said group of subnetworks on all DHCP servers, and
    wherein the monitoring and optimizing of the performance and availability of the DHCP service, comprises sending an action if the global utilization for said group of subnetworks reaches a predetermined thereshold.

17. The method according to claim 16, wherein the retrieved information comprises for each DHCP server a total number of IP addresses presently allocated to each group of subnetworks, the total number of IP addresses of a group of subnetworks in a DHCP server being equal to the sum of IP addresses presently allocated to each subnetwork defined within said group of subnetworks.

18. The method according to claim 17, wherein the retrieved information comprises for each DHCP server a total number of IP addresses that can be potentially allocated to each group of subnetworks, the total number of IP addresses of a group of subnetworks in a DHCP server being equal to the sum of IP addresses that can be potentially allocated to each subnetwork defined within said group of subnetworks.

19. The method according to claim 18, further comprising:
    recording said one or plurality of DHCP servers in a list.

20. The method according to claim 19, wherein the step of aggregating said information for each group of subnetworks comprises the further steps of:
    building a list of groups of subnetworks using information retrieved from DHCP servers.

21. The method according to claim 20, wherein the step of aggregating said information for a group of subnetworks comprises the further step of:
    determining a total number of IP addresses presently allocated to said group of subnetworks on all DHCP servers, the total number of IP addresses being equal to the sum of IP addresses presently allocated to said group of subnetworks in each DHCP server.

22. The method according to claim 21, wherein the step of aggregating said information for a group of subnetworks comprises the further step of:
    determining a total number of IP addresses that can be potentially allocated to said group of subnetworks on all DHCP servers, the total number of IP addresses being equal to the sum of IP addresses that can be potentially allocated to said group of subnetworks in each DHCP server.

23. The method according to claim 16, wherein the method optimally adjusts configuration parameters.

24. The method according to claim 16, further comprising collecting information related to utilization of IP address pools within the one or a plurality of DHCP servers using probes.

25. The method according to claim 16, further comprising measuring utilization of IP address pools using probes.

26. The method according to claim 16, further comprising recording the global utilization for said group of subnetworks with a time stamp.

27. A computer program product comprising one or more computer-readable, tangible storage devices and computer-readable program instructions which are stored on the one or more storage devices and when executed by one or more processors, perform the method of claim 16.

* * * * *